US012426049B2

(12) United States Patent
Shapin et al.

(10) Patent No.: US 12,426,049 B2
(45) Date of Patent: Sep. 23, 2025

(54) METHODS AND APPARATUSES FOR CONTROLLING PREEMPTION OF UPLINK TRANSMISSIONS IN A COMMUNICATION NETWORK

(71) Applicant: Telefonaktiebolaget LM Ericsson (publ), Stockholm (SE)

(72) Inventors: Alexey Shapin, Luleå (SE); Ali Behravan, Stockholm (SE); Yufei Blankenship, Kildeer, IL (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 398 days.

(21) Appl. No.: 17/766,751

(22) PCT Filed: Oct. 6, 2020

(86) PCT No.: PCT/SE2020/050948
§ 371 (c)(1),
(2) Date: Apr. 6, 2022

(87) PCT Pub. No.: WO2021/071409
PCT Pub. Date: Apr. 15, 2021

(65) Prior Publication Data
US 2024/0008041 A1    Jan. 4, 2024

Related U.S. Application Data

(60) Provisional application No. 62/911,429, filed on Oct. 7, 2019.

(51) Int. Cl.
*H04W 4/00* (2018.01)
*H04W 72/21* (2023.01)
(52) U.S. Cl.
CPC ................................. *H04W 72/21* (2023.01)

(58) Field of Classification Search
None
See application file for complete search history.

(56) References Cited

U.S. PATENT DOCUMENTS

| 2019/0254081 A1 | 8/2019 | Li et al. |
| 2021/0068195 A1* | 3/2021 | Yang ...................... H04W 72/56 |

FOREIGN PATENT DOCUMENTS

| EP | 4113892 A1 | 1/2023 |
| WO | 2018203409 A1 | 11/2018 |

(Continued)

OTHER PUBLICATIONS

"DL/UL intra-UE transmission prioritization and multiplexing", 3GPP TSG RAN WG1 Meeting #94bis, R1-1810718, Chengdu, China, Oct. 8-12, 2018, 1-9.

(Continued)

*Primary Examiner* — Zewdu A Beyen
(74) *Attorney, Agent, or Firm* — Murphy, Bilak & Homiller, PLLC

(57) ABSTRACT

A User Equipment (UE) (12) configured for operation in a wireless communication network (10) ignores a received preemption indicator responsive to determining that the involved data transmission by the UE (12) will carry Uplink Control Information (UCI) from the UE (12), at least when the UCI is of a certain type or priority. For example, the UE (12) ignores the preemption indicator if the UCI is of the certain type or priority, and otherwise follows the preemption indicator by skipping the uplink data transmission. Correspondingly, a radio network node (22) configured for operation in the wireless communication network (10) determines whether an uplink data transmission by a UE (12) on certain radio resources will include UCI, and the radio network node (22) transmits or does not transmit a preemption indicator preempting use by the UE (12) of the certain (Continued)

radio resources for the uplink data transmission, in dependence on the determination.

4 Claims, 8 Drawing Sheets

(56) References Cited

FOREIGN PATENT DOCUMENTS

| WO | 2018232726 A1 | 12/2018 |
|---|---|---|
| WO | 2019058022 A1 | 3/2019 |
| WO | 2019134083 A1 | 7/2019 |
| WO | 2019139446 A1 | 7/2019 |

OTHER PUBLICATIONS

"Enhanced inter UE Tx prioritization/multiplexing", 3GPP TSG RAN WG1 #98, R1-1908814, ETRI, Prague, CZ, Aug. 26-30, 2019, 4 pages.
"On UL cancellation scheme for NR URLLC", 3GPP TSG RAN WG1 #98, R1-1909369, Aug. 26-30, 2019, 5 pages.
"3rd Generation Partnership Project; Technical Specification Group Radio Access Network; NR; Multiplexing and channel coding (Release 15)", 3GPP TS 38.212 V15.3.0, Sep. 2018, 99 pages.
"3rd Generation Partnership Project; Technical Specification Group Radio Access Network; NR; Physical channels and modulation (Release 15) The present", 3GPP TS 38.211 V15.3.0, Sep. 2018, 96 pages.
"3rd Generation Partnership Project; Technical Specification Group Radio Access Network; NR; Physical layer procedures for control (Release 15)", 3GPP TS 38.213 V15.3.0, Sep. 2018, 101 pages.
"3rd Generation Partnership Project; Technical Specification Group Radio Access Network; NR; Physical layer procedures for control (Release 15) The present", 3GPP TS 38.213 V15.6.0, Jun. 2019, 107 pages.
"3rd Generation Partnership Project; Technical Specification Group Services and System Aspects; System Architecture for the 5G System (5GS); Stage 2 (Release 16) The present", 3GPP TS 23.501 V16.2.0, Sep. 2019, 391 pages.
"On UL cancellation scheme for NR URLLC", 3GPP TSG RAN WG1 #96bis, R1-1905433, WILUS Inc., Xi'an, China, Apr. 8-12, 2019.
3GPP, "3rd Generation Partnership Project; Technical Specification Group Radio Access Network; NR; Radio Resource Control (RRC) protocol specification (Release 15)", 3GPP TS 38.331 V15.2.1, Jun. 2018, 1-303.
"Considerations for UCI for URLLC", 3GPP TSG RAN WG1 Meeting 91, R1-1720840, Institute for Information Industry (III), Reno, USA, Nov. 27-Dec. 1, 2017, 4 pages.
"UCI enhancements", 3GPP TSG RAN WG1 #98, R1-1908813, ETRI, Prague, CZ, Aug. 26-30, 2019, 6 pages.

* cited by examiner

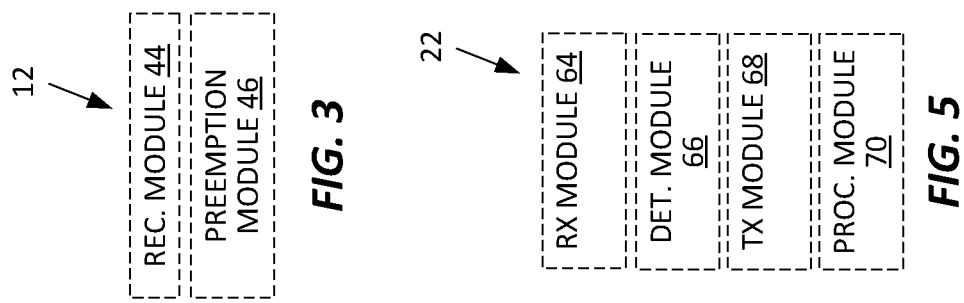
FIG. 3
FIG. 5
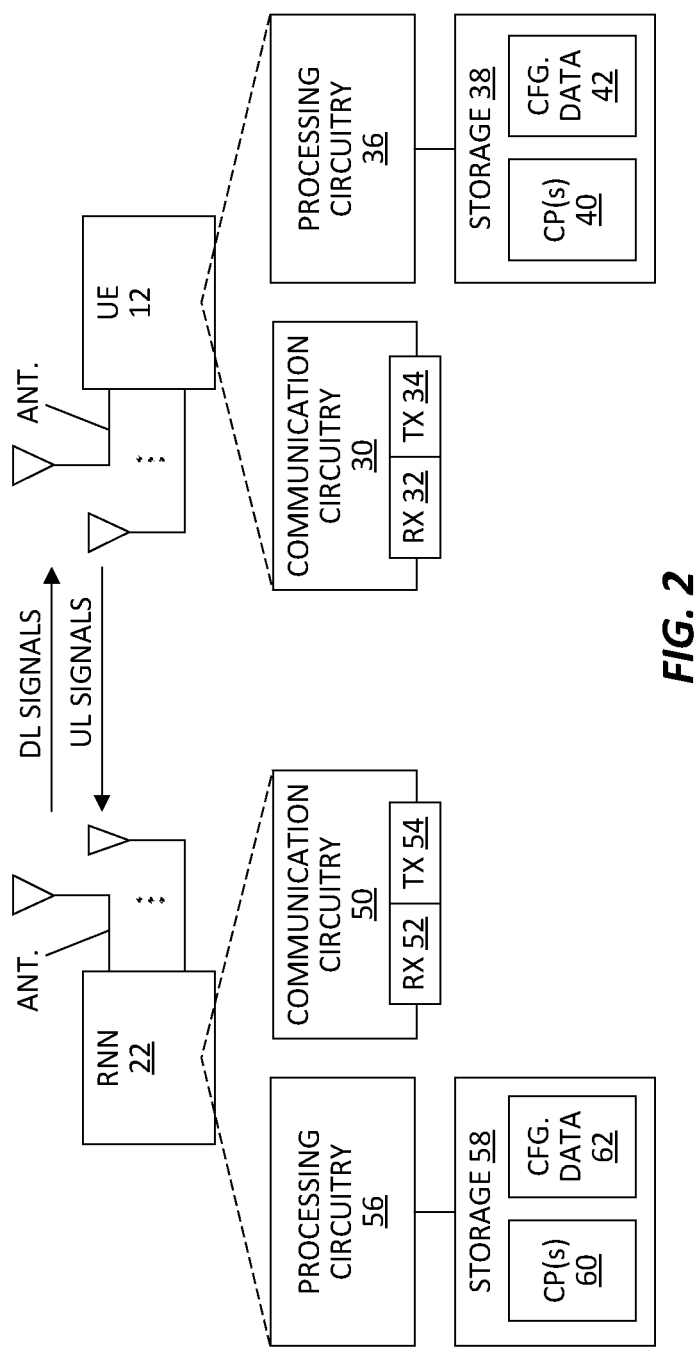
FIG. 2

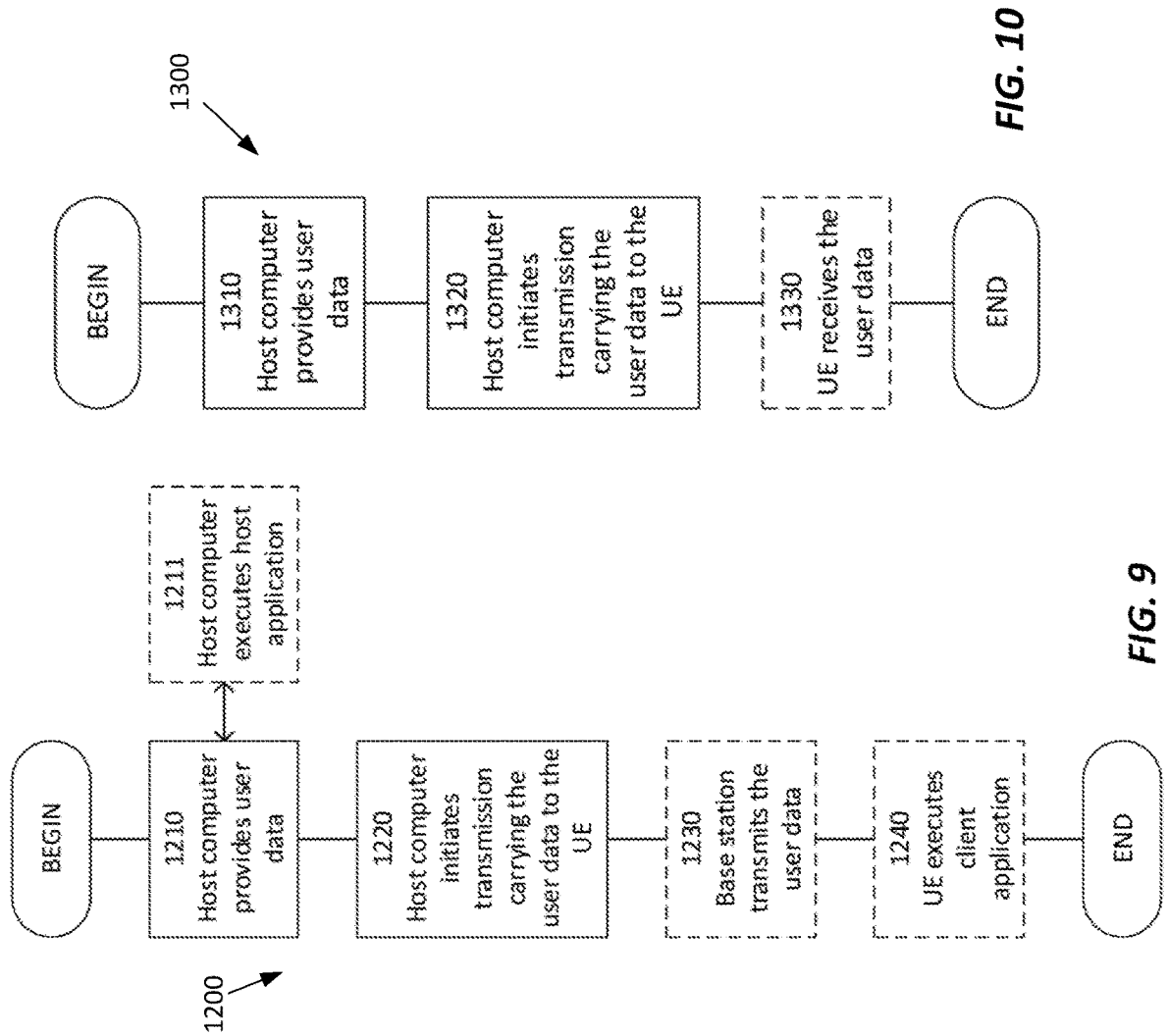

METHODS AND APPARATUSES FOR CONTROLLING PREEMPTION OF UPLINK TRANSMISSIONS IN A COMMUNICATION NETWORK

TECHNICAL FIELD

The invention relates to controlling the preemption of uplink transmissions in a wireless communication network.

BACKGROUND

Key uses cases contemplated for wireless communication networks based on the Fifth Generation (5G) New Radio (NR) specifications include Ultra-reliable and low latency communication (URLLC). URLLC has strict requirements on transmission reliability and latency, i.e., 99.9999% reliability within 1 millisecond (ms) of one-way latency. NR Release 15 (Rel-15) introduces several new features and enhancements in support of the URLLC requirements. Standardization work in furtherance of Rel-16 focuses on further enhancing URLLC system performance, as well as ensuring reliable and efficient coexistence of URLLC and other types of communications. One example scenario is when both enhanced mobile broadband (eMBB) and URLLC User Equipments (UEs) co-exist in the same cell.

Among the two approaches identified for supporting coexistence, one involves the adjustment of transmission power for affected URLLC transmission. The other approach involves "preemption" of transmissions that may interfere with URLLC transmissions.

In the power-adjustment approach, increasing the power of URLCC transmissions makes their reception more resilient to interference from eMBB users. Here, "increased" power refers to an increase over the transmit power level(s) that would otherwise be used. Power-control details for Rel-15 UEs appear in Section 7.1.1 of the Third Generation Partnership Project (3GPP) Technical Specification (TS) 38.213 and one advantage of compensating for potential interference to URLLC transmissions by increasing the involved transmit power levels is that no changes need be made to Rel-15 power-control details. That is, there is no need to change the behavior of eMBB UEs.

On the other hand, the power-adjustment based approach has certain attendant disadvantages. One disadvantage is that significant increases in transmit power spectral density may be required to guarantee the performance of a URLLC UE that is subject to interference from eMBB traffic. If the affected URLLC UE is distant from its serving base station, it may not have a power budget sufficient to provide the required increase(s) in transmit power. Consequently, the Signal to Interference and Noise Ratio (SINR) of the affected URLL communications may be lower than required.

As for the preemption approach, it contemplates "preempting" (cancelling) an interfering transmission. Consider, for example, an eMBB transmission that is forthcoming on certain radio resources. When a URLLC UE is scheduled to use the same resources—i.e., time/frequency resources that are already scheduled for eMBB use—the involved base station can transmit a preemption indicator to the eMBB UE, to cause the eMBB to skip the eMBB transmission. The resources in question may be "preconfigured resources," meaning that they may be pre-allocated.

A specific example involves a situation where eMBB traffic is scheduled to occupy all Physical Resource Blocks (PRBs) in a given time slot, and a time-sensitive transmission needs to be performed in the time slot. "Time sensitive" implies that essentially instant access to the transmission channel is required, such that deferring the transmission until the next time slot imposes too much delay.

To better appreciate possible interference problems, the time between an uplink grant and the corresponding uplink transmission may be significantly shorter for URLLC traffic than for eMBB traffic. Hence, the time/frequency resources corresponding to an uplink grant for a URLLC transmission may already have been scheduled for eMBB transmissions. Correspondingly, the preemption indicator allows the involved base station to preempt (cancel) the potentially interfering eMBB traffic.

SUMMARY

A User Equipment (UE) controls an uplink data transmission with respect to a preemption indicator, in a manner that accounts for a need by the UE to transmit Uplink Control Information (UCI). For example, the UE receives a preemption indicator that applies to an uplink data transmission that will coincide with a transmission of UCI by the UE, and the UE ignores the preemption indicator and performs the uplink data transmission with the UCI multiplexed therein. As a refinement, the UE ignores the preemption indicator only if the UCI is of a certain type or priority. Alternatively, the UE follows the preemption indicator in that it skips the uplink data transmission, but it performs a separate transmission of the UCI that would have been included in the uplink data transmission. As a further alternative, the UE adapts its signal-generation operations or modifies the results of such operations, so that the uplink data transmission includes at least some of the UCI while avoiding use of the particular radio resources associated with the preemption indicator.

Complementing the foregoing UE operations, a base station or other radio network decides whether to transmit a preemption indication with respect to an uplink data transmission by a UE, in dependence on determining whether the uplink data transmission will include UCI, or in dependence on whether the uplink data transmission will include UCI of a certain type or priority. Additionally, or alternatively, a radio network node receives an uplink data transmission from a UE on radio resources that include preempted radio resources, and processes the uplink data transmission, as received at the radio network node, to account for the UE avoiding use of the preempted radio resources.

In an example embodiment, a method performed by a UE configured for operation in a wireless communication network includes receiving a preemption indicator, indicating preemption of a forthcoming data transmission by the UE. The method further includes the UE, responsive to determining that the data transmission will carry UCI from the UE, ignoring the preemption indicator by performing the data transmission, including the UCI, at least when the UCI is of a certain type or priority.

In another example, a method performed by a UE configured for operation in a wireless communication network includes receiving a preemption indicator from a radio network node of the wireless communication network, and, when an uplink data transmission that would otherwise be preempted in accordance with the preemption indicator coincides with a transmission of UCI by the UE, ignoring the transmission preemption indicator by performing the uplink data transmission, data conveyed via the uplink data transmission having the UCI multiplexed therein. As a refinement, the UE ignores the preemption indicator only if the UCI is of a certain type or priority.

In another example, a method performed by a UE configured for operation in a wireless communication network includes receiving a preemption indicator from a radio network node of the wireless communication network, and following the preemption indictor and skipping an uplink data transmission to which the preemption indicator applies, and, when the uplink data transmission was to carry UCI from the UE, performing a separate transmission of the UCI.

In another example, a method performed by a UE configured for operation in a wireless communication network includes receiving a preemption indicator from a radio network node of the wireless communication network, and, when the preemption indicator applies to an uplink data transmission by the UE that will carry UCI from the UE, either ignoring the preemption indicator, or following the preemption indicator and performing a separate transmission of the UCI. Here, "ignoring the preemption indicator" means performing the uplink data transmission, instead of canceling or skipping it, as would be done in a "normal" response by the UE to the preemption indicator.

In another example, a method performed by a UE configured for operation in a wireless communication network includes monitoring for reception of a preemption indicator in relation to a pending uplink data transmission by the UE that will not include UCI from the UE, and skipping monitoring for reception of a preemption indicator in relation to a pending uplink data transmission by the UE that will include UCI from the UE. That is, in a case where the UE will perform an upcoming data transmission even if it receives a preemption indicator applicable to that transmission, the UE may simply skip monitoring for reception of any such preemption indicator.

In another example, a method performed by a UE configured for operation in a wireless communication network includes, with respect to performing an uplink data transmission for which the UE has received a preemption indicator and for which the UE is to include UCI, the UE applying the preemption indicator before multiplexing uplink data and the UCI, by discarding at least a portion of the data to be included in the uplink data transmission. The discarding avoids use by the UE 12 of the preempted radio resources. As an alternative, the UE applies the preemption indicator after multiplexing the uplink data and the UCI, by discarding a portion of the multiplexing result, to thereby avoid use of the preempted radio resources.

In another example, a UE configured for operation in a wireless communication network includes communication circuitry and processing circuitry. The communication circuitry is configured to send signals to radio network nodes of the wireless communication network and to receive signals from radio network nodes of the wireless communication network. The processing circuitry is operatively associated with the communication circuitry and configured to perform operations implementing any of the above-described UE-performed methods.

In another example, a method performed by a radio network node configured for operation in a wireless communication network includes determining whether an uplink data transmission by a UE on certain radio resources will include UCI. The method further includes the radio network node transmitting or not transmitting a preemption indicator preempting use by the UE of the certain radio resources for the uplink data transmission, in dependence on said determining.

In another example, a method performed by a radio network node configured for operation in a wireless communication network includes receiving an uplink data transmission from a UE on radio resources that include preempted radio resources. Correspondingly, the method includes processing the uplink data transmission, as received at the radio network node, to account for the UE avoiding use of the preempted radio resources.

In another example, a radio network node configured for operation in a wireless communication network includes communication circuitry and processing circuitry. The communication circuitry is configured to transmit signals to UEs and receive signals from UEs, and the processing circuitry is operatively associated with the communication circuitry and configured to perform operations implementing any of the above-described radio-network-node methods.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 2 is a block diagram of example embodiments of a radio network node and a User Equipment (UE).

FIG. 3 is a block diagram of another embodiment of a UE.

FIG. 5 is a block diagram of another embodiment of a radio network node.

FIGS. 9-12 are logic flow diagrams of example methods of operation by or between a UE, a base station, and a host computer, such as seen in FIGS. 7 and 8.

DETAILED DESCRIPTION

Figure 1:
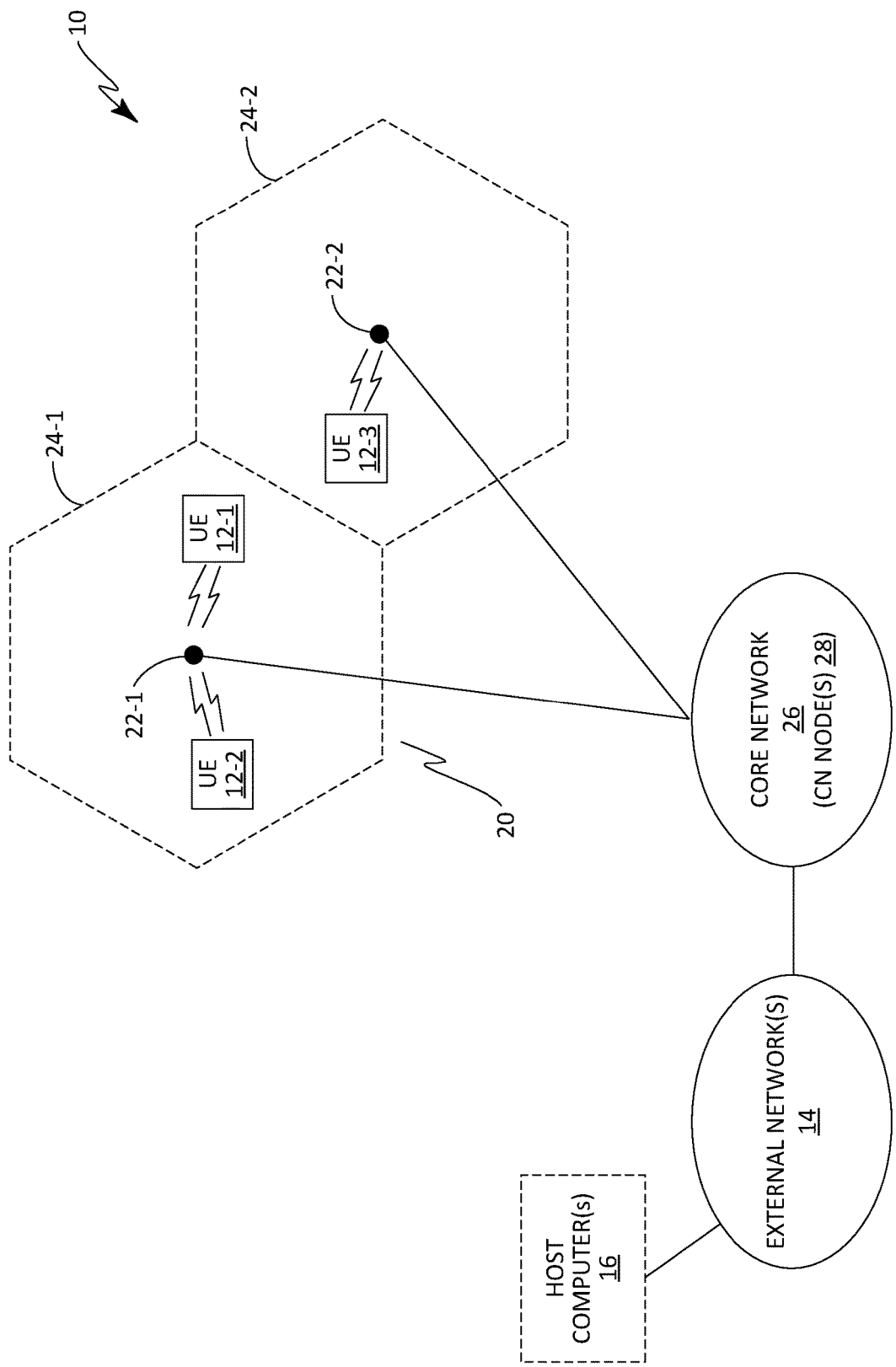
FIG. 1 is a block diagram of one embodiment of a wireless communication network.

As an underlying assumption, a conventional User Equipment (UE) is configured to include Uplink Control Information (UCI) in an uplink data transmission, if the time for transmitting the UCI coincides with the time for transmitting the uplink data. As a specific example, a UE performs a Physical Uplink Control Channel (PUCCH) transmission to send UCI at a certain time, unless that time coincides with a Physical Uplink Shared Channel (PUSCH) transmission to be performed by the UE. In that case, the UE performs the PUSCH transmission with the UCI multiplexed therein. Example details regarding PUSCH transmissions with UCI multiplexed therein ("PUSCH plus UCI") appear in Section 9.3 of the Third Generation Partnership Project (3GPP) Technical Specification (TS) 38.213 V15.6.0. Transmissions involving PUSCH plus UCI also may be referred to as "piggybacking" UCI with PUSCH.

Independent from the PUSCH/UCI multiplexing provisions, ongoing work by the 3GPP includes implementation of a "preemption indicator" as introduced in the Background section of this document. In an example use of preemption, there may be one or more pending uplink enhanced Mobile Broadband (eMBB) transmissions, where a portion of the radio resources allocated for the eMBB transmission(s) are then allocated for Ultra-Reliable Low Latency Communication (URLLC) use. That portion of the radio resources may be referred to as "overlapped" or "conflicting" radio resources.

Because simultaneous use of the overlapped resources for the eMBB and URLLC transmissions may result in the eMBB transmission(s) interfering with the URLLC transmission (e.g., may interfere with reception of the URLLC transmission at the affected receiver), the radio network node serving the involved UEs may transmit a preemption indicator, to cancel the eMBB transmission(s). While preemption serves the interests of URLLC by canceling interfering eMBB transmissions, one disadvantage recognized herein is that preemption does not account for the fact that the canceled eMBB transmissions might have included UCI from the affected UE(s). That is, the involved UEs may have a default or baseline configuration according to which they include UCI in their uplink eMBB transmissions, at least when the transmission time for the eMBB transmission coincides with the transmission time of the involved UCI.

Consequently, use of preemption may prevent the involved wireless communication network from receiving important UCI on a timely basis, such as where a UE must return Hybrid Automatic Repeat reQuest (HARQ) signaling at a certain time with respect to a downlink transmission received by the UE. For example, assume that the time for the UE to send HARQ coincides with an uplink transmission to be performed by the UE. The conventional UE would transmit the HARQ by multiplexing it into the data conveyed in the uplink transmission and, if the conventional UE receives a preemption indicator applicable to the uplink data transmission, it cancels the uplink data transmission, meaning that the preemption indicator not only canceled the transmission of uplink data by the UE, but also canceled the transmission of critical UCI by the UE.

Methods and apparatuses detailed herein avoid or ameliorate such cancelation problems, while still preserving all or most of the operational value gained by use of preemption. In one aspect, preemption-related operations at the UE and/or at the involved base station or other type of radio network node are "content aware" or "channel aware." As such, whether preemption is used or followed, or not used or ignored, depends on the content or the channels that will be affected by preemption. For example, whether a UE preempts a transmission to which a received preemption indicator applies depends on what type of Uplink (UL) channel (s) are involved in the affected transmission and/or on the content of the affected transmission. Here, the "affected" transmission is the uplink transmission to which the preemption applies.

FIG. 1 is a block diagram of a wireless communication network 10 according to an example embodiment, where the network 10 provides one or more communication services to any number of User Equipments (UEs) 12, such as by coupling the UEs 12 to one or more external networks 14, such as the Internet. Among other things, the network 10 may operate as an access network that provides access to one or more host computers 16 that are reachable by the UEs 12 through the external network(s) 14.

In a non-limiting example, the network 10 is configured as a Fifth Generation (5G) New Radio (NR) network. Example details for 5G NR implementations of the network 10 appear in various Technical Specifications (TSs) promulgated by the Third Generation Partnership Project (3GPP), such as TS 23.501 V16.2.0 (2019 September 24), TS 38.211 V15.3.0 (2018 September), TS 32.212 V15.3.0 (2018 September), TS 38.213 V15.3.0 (2018 September), and TS 38.331 V15.2.1 (2018 June).

In the example 5G NR context, the network 10 provides Ultra Reliability Low Latency Communication (URLLC) and enhanced Mobile BroadBand (eMBB) services under a unified air interface, and the network 10 uses preemption to avoid or reduce the occurrence of eMBB transmissions that may interfere with URLLC transmissions. However, other implementations of the network 10 are contemplated and the techniques disclosed herein are applicable to any type of network that use some type of preemption for canceling certain uplink data transmissions.

The UEs 12, with three UEs 12-1, 12-2, and 12-3 shown merely for example purposes, may be any kind or any mix of UE types and may engage in essentially any type of communications or mix of communication types. Although the term "UE" has particular meanings in the context of 3GPP specifications, the term more broadly connotes essentially any type of wireless communication apparatus or device that is configured for operation in the network 10 but is not part of the permanent or fixed network infrastructure. Commonly, UEs are not owned by the operator or owner of the network 10 and, instead, are owned or associated with third parties that have subscriptions or other agreements that provide for authorized use of the network 10 by their respective UEs.

By way of non-limiting example, any one or more of the UEs 12 may be a smartphone or other mobile communication device, a network adapter or dongle, a Machine Type Communication (MTC) device, an Internet-of-Things (IoT) device, or other wireless communication apparatus that is configured for operating on the air interface (or air interfaces) provided by the network 10. As noted, the air interface may be an NR interface. Additionally, or alternatively, the network 10 provides one or more air interfaces according to other Radio Access Technologies (RATs), such as Long Term Evolution (LTE or 4G).

As a quick point regarding reference numbers, one or more of the drawings may show suffixed reference numbers but the use of reference numbers herein includes suffixing only where the suffixing aids clarity. A reference number without suffixing may be used to refer to any given one of the things identified by the reference number, or to refer to any given plurality of the things identified by the reference number. Thus, a "UE 12" refers to a given UE in context, and "the UEs 12" refers to a given two or more UEs in context.

Turning back to further details of the illustrated network 10, the network 10 includes a Radio Access Network (RAN) 20 that includes one or more radio network nodes 22, with two radio network nodes 22-1 and 22-2 shown merely for example. Each radio network node 22 provides radio coverage in a corresponding geographic area or areas and may be regarded as providing one or more network "cells" 24. For example, the radio network node 22-1 provides a cell 24-1 and the radio network node 22-2 provides a cell 24-2. Cell coverage may overlap and any given cell 24 may comprise or be "covered" in a radio-signal sense using beamforming. For example, a radio network node 22 includes an antenna array with a plurality of antenna elements having one or more polarizations, and the radio network node 22 uses digital, analog, or hybrid beamforming to steer or sweep directional radio beams over or within one or more geographical areas, to provide radio service to UEs 12 operating in those areas.

FIG. 2 illustrates example embodiments for a UE 12 and a radio network node 22, with the UE 12 including communication circuitry 30 comprising receiver circuitry 32 and transmitter circuitry 34, along with processing circuitry 36, and storage 38. The storage 38 comprises one or more types of computer-readable media, such as one or more kinds of memory circuits or devices. Examples include any one or more of SRAM, DRAM, FLASH, EEPROM, Solid State Disk (SSD), and electromagnetic disk storage.

The processing circuitry 36 comprises one or more types of digital processing circuitry, such as one or more microprocessors, microcontrollers, Digital Signal Processors (DSPs), Field Programmable Gate Arrays (FPGAs), Application Specific Integrated Circuits (ASICs), or one or more Systems-on-a-Chip (SoC). Broadly, the processing circuitry 36 comprises fixed, non-programmable circuitry, or comprises programmed circuitry that is specially adapted to carry out the relevant preemption-related operations described herein for a UE 12, or comprises a mix of fixed and programmed circuitry.

In at least one such embodiment, the UE 12 includes one or more digital processing circuits, such as one or more microprocessors, that are configured as or operative as the illustrated processing circuitry 36, based on their execution of stored computer program instructions. To that end, the storage 38 in one or more embodiments stores one or more computer programs (CPs) 40, where "stores" here does not necessarily connote permanent or unchanging storage but does connote retention of at least some persistence, such as storage in working memory for program execution. The storage 38 in one or more embodiments also provides volatile and/or non-volatile storage for one or more items of configuration data (CFG. DATA) 42. Such data may be pre-provisioned in the UE 12, signaled to the UE 12 by the network 10, or may comprise a mix of pre-provisioned and signaled information.

With the above in mind, a UE 12 configured for operation in a wireless communication network 10 comprises communication circuitry 30 configured for sending signals to and receiving signals from radio network nodes 22 in the network 10. The communication circuitry includes, for example, radio transceiver circuitry configured for radio-based communications in the network 10, such as a radiofrequency receiver 32 and a radiofrequency transmitter 34.

Further, the UE 12 comprises processing circuitry 36 that is operatively associated with the communication circuitry 30. Here, "operatively associated" means that the processing circuitry 36 sends and receives data and control signaling via the communication circuitry 30. For example, the processing circuitry 36 includes or is associated with baseband processing circuitry that implements a radio protocol stack used for receiving radio signals from a radio network node 22 via the communication circuitry 30 and recovering control and data from the received signals, and for encoding and modulating outgoing control information and data, for transmission via the communication circuitry 30.

The processing circuitry 36 in one or more embodiments is configured to receive a preemption indicator, indicating preemption of a forthcoming data transmission by the UE 12. The processing circuitry 36 is further configured to perform, in response to determining that the data transmission will carry Uplink Control Information (UCI) from the UE 12, one of the following operations: (a) ignore the preemption indicator and perform the data transmission, including the UCI, at least when the UCI is of a certain type or priority; or (b) follow the preemption indicator and skip the data transmission, and separately transmit the UCI, at least when the UCI is of a certain type or priority. As a point of clarity, in at least one embodiment of the UE 12, the processing circuitry 36 is configured only for one of the (a) or (b) operations—that is, the processing circuitry 36 is configured to perform the (a) operation or the (b) operation, but not to select between (a) and (b) or to perform both (a) and (b).

In at least one implementation, the processing circuitry 36 is configured to ignore the preemption indicator and perform the data transmission with the UCI included therein, regardless of the type or priority of the UCI. Alternatively, the processing circuitry 36 is configured to ignore the preemption indicator and perform the data transmission with the UCI included therein, when the UCI is Hybrid Automatic Repeat reQuest (HARQ) feedback from the UE. More broadly, in at least one implementation, the processing circuitry 36 is configured to ignore the preemption indicator and perform the data transmission with the UCI included therein, when a priority of the UCI is at or above a certain priority level or priority categorization.

As for implementations that involve the processing circuitry 36 performing a separate transmission of UCI that would have been sent in a data transmission had the data transmission not been canceled, the processing circuitry 36 is configured to separately transmit the UCI at a time corresponding to the data transmission or at a related subsequent time.

Other implementation or operational details related to the use of "preconfigured" radio resources, which may be understood as radio resources that have been pre-scheduled for use. In this context, the UE 12 may have a pending uplink data transmission that will make use of prescheduled radio resources and the UE 12 may receive a preemption indicator from its serving radio network node 22 that applies to the pending uplink data transmission. Here, saying that the preemption indicator applies to the pending uplink data transmission means that the preemption indicator—also referred to as a cancellation indicator—indicates preemptive use of some or all of the radio resources that will be used by the UE 12 for the pending (forthcoming) uplink data transmission.

The association between a preemption indicator and a pending uplink data transmission may be known implicitly, such as a rule wherein a preemption indicator applies to whatever uplink data transmission is then pending when the UE 12 receives the preemption indicator, or the rule may be that it applies at some predefined point in the future. However, the preemption indicator also may indicate the radio resources that are preempted. Here, a "preempted radio resource" is one that is preemptively used or prioritized for other than its originally intended use. For example, a radio resource that was scheduled or intended for use by the UE 12 for performing an uplink data transmission but is then targeted for preemptive use, for another purpose—e.g., a radio resource to be used for an eMBB transmission by a UE 12 may be preempted, so that the radio resource is used for a URLLC transmission by another UE 12.

In any case, in one or more implementations or in one or more operating scenarios, the data transmission in question was to use prescheduled radio resources and the preemption indicator indicates preemptive use of the prescheduled radio resources.

In at least one implementation, according to applicable specifications and associated definitions by the 3GPP, the data transmission is an enhanced Mobile Broadband (eMBB) transmission, and the preemption indicator provides for preemptive use of radio resources allocated for the eMBB transmission by another UE 12 engaged in a URLLC service. In at least one such embodiment, the data transmission is a Physical Uplink Shared Channel (PUSCH) transmission, and wherein the processing circuitry 36 is configured to determine that the data transmission will carry the UCI from the UE 12 by determining that a time for performing a Physical Uplink Control Channel (PUCCH) transmission coincides with a time of the PUSCH transmission.

In the PUSCH/PUCH context, the processing circuitry 36 "ignores" a preemption indicator by multiplexing the UCI with data to be conveyed in the PUSCH transmission and performs the PUSCH transmission. That is, in this context, ignoring a preemption indicator that applies to a PUSCH transmission that is coincident with a time for transmitting UCI, the UE 12 effectively operates as if no preemption indicator was sent—i.e., it performs the PUSCH transmission rather than canceling it, and it includes the UCI within the PUSCH.

As a further variation or extension, or in another embodiment of the UE 12, the processing circuitry 36 is configured to monitor for reception of a preemption indicator in relation to a pending uplink data transmission by the UE 12 that will not include Uplink Control Information (UCI) from the UE 12, and to skip monitoring for reception of a preemption indicator in relation to a pending uplink data transmission by the UE 12 that will include UCI from the UE. In other words, in a scenario where the UE 12 would ignore a received preemption indicator, the UE 12 may further streamline its reception processing operations by not monitoring for reception of a preemption indicator, e.g., it does not monitor the control channel or does not monitor specific radio resources that would be used by the serving radio network node 12 for sending a preemption indicator applicable to the uplink transmission in question.

In another embodiment of the UE 12, with respect to performing an uplink data transmission for which the UE 12 has received a preemption indicator and for which the UE 12 is to include UCI, the processing circuitry 36 is configured to perform one of: (a) apply the preemption indicator before multiplexing uplink data and the UCI, by discarding at least a portion of the data to be included in the uplink data transmission, to thereby avoid use of preempted radio resources; or (b) apply the preemption indicator after multiplexing the data to be included in the uplink data transmission with the UCI, by discarding a portion of the multiplexing result, to thereby avoid use of the preempted radio resources.

FIG. 3 illustrates another embodiment of the UE 12, where the UE 12 comprises one or more processing units or processing modules, such as functional modules realized via program execution by one or more computer processors. The realization may be based on the processing arrangement depicted in FIG. 2 for the UE 12, but other underlying physical-circuit arrangements are also possible.

The example UE 12 comprises a receiving module (REC. MODULE) 44 that is configured to receive a preemption indicator, indicating preemption of a forthcoming data transmission by the UE 12. Here, "configured to receive" means, for example, that the involved processing circuitry and corresponding functions detect, parse, or otherwise respond to an information element (IE) or other control signaling used by the network 10 to signal preemption.

In one embodiment, the example UE 12 further comprises a preemption module 46 that is configured to, in response to determining that the data transmission will carry UCI from the UE 12, ignore the preemption indicator and perform the data transmission, including the UCI. As an alternative, the preemption module 46 may be configured to ignore the preemption indicator only when the UCI is of a certain type or priority.

In an alternative embodiment, the example UE 12 does not ignore preemption indicators. Instead, upon receiving a preemption indicator for a forthcoming data transmission that will carry UCI from the UE 12, the preemption module 46 causes the UE 12 to follow the preemption indicator—i.e., to skip the data transmission—but the UE 12 transmits the UCI separately. As an alternative to always performing a separate transmission of the UCI that would have been included in the preempted data transmission, the preemption module 46 may be configured to trigger the separate transmission of the UCI only if the UCI is of a certain type or priority. For example, UCI for a certain communication service may have a high priority, or HARQ or other types of UCI may be deemed critical, whereas other types of UCI may be deemed non-critical. Of course, the type/priority designations may be dynamically adjusted, in dependence on the communication services in use or on other factors, such as according to control signaling received from the network 10.

Figure 4:
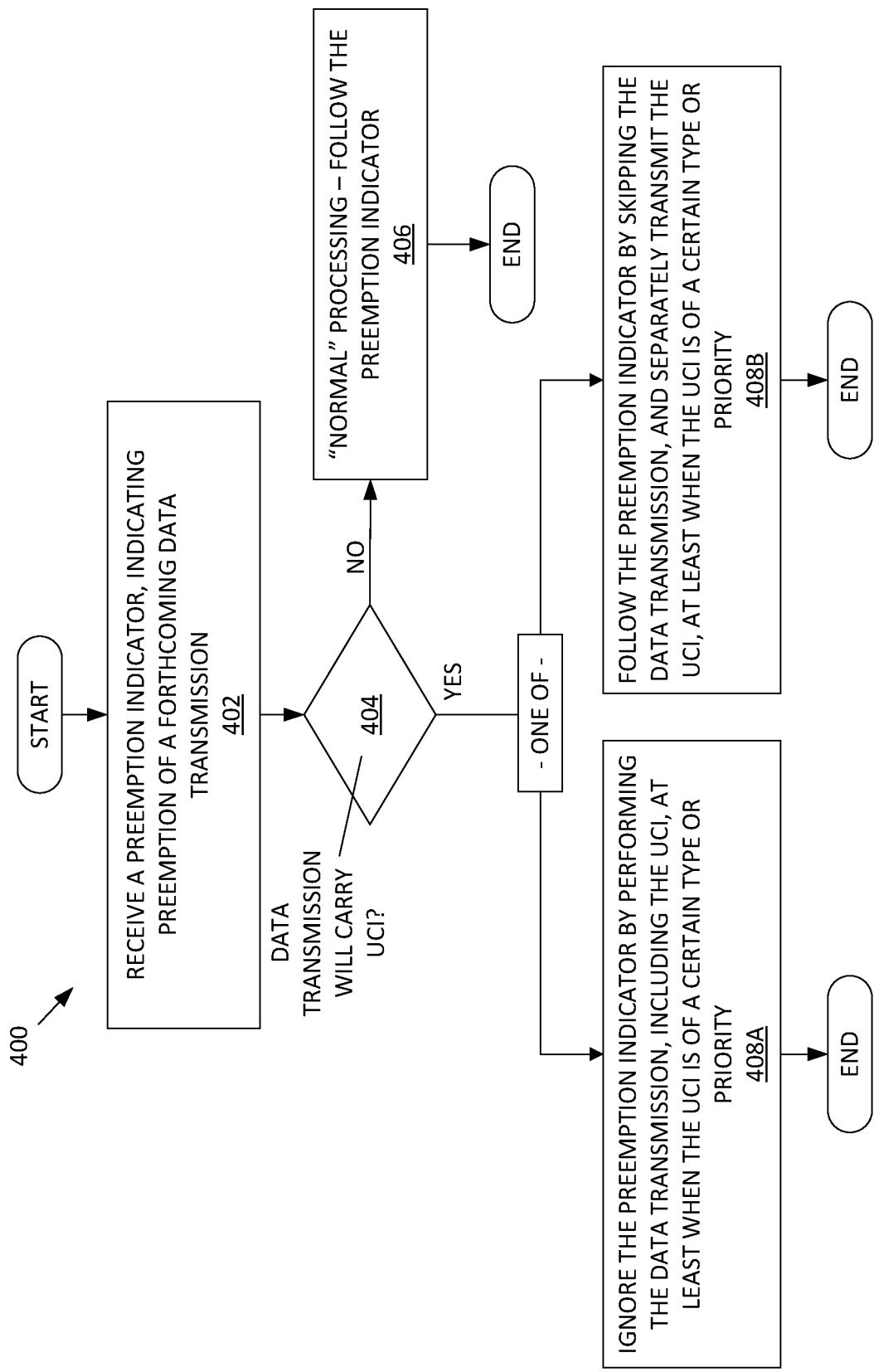
FIG. 4 is a logic flow diagram of one embodiment of a method of operation by a UE.

FIG. 4 illustrates one embodiment of a method 400 of operation by a UE 12 that is configured for operation in a wireless communication network, such as the network 10. The processing circuitry 36 depicted for the UE 12 in FIG. 2 may, for example, be configured to carry out the operations implementing the method 400, but implementation of the method 400 is not limited to the example circuitry depicted in FIG. 2. Further, while the method 400 depicts a processing flow that has "start" and "end" points, the method 400 may be repeated or carried out on an ongoing basis, as needed.

The method 400 includes the UE 12 receiving (Block 402) a preemption indicator, indicating preemption of a forthcoming data transmission by the UE 12. The data transmission is "forthcoming" in the sense that it is scheduled or is otherwise pending at the UE 12. The UE 12 may have received a specific grant indicating the radio resources to be used by the UE 12 for performing the data transmission, or the resources in question may be pre-scheduled or part of a semi-persistent grant, where certain radio resources—e.g., time/frequency resources in an OFDM time-frequency grid—are allocated on a recurring basis. The data transmission is a PUSCH transmission, for example, involving the transmission of data for an eMBB service.

The method 400 further includes the UE 12 determining whether the data transmission will carry UCI from the UE 12. As explained earlier, the UE 12 may be configured for a default or normal behavior in which it sends UCI at certain times, e.g., a defined number of time slots or subframes after reception of downlink data and/or according to a defined periodicity. Further according to the normal or default behavior, the UE 12 transmits the UCI at the defined times using a separate control-channel transmission, unless the time of a scheduled data-channel transmission coincides with the time for sending the UCI. In such cases, the UE 12 includes the UCI in the data-channel transmission, such as by using some of the radio resources allocated for the data transmission to instead carry the UCI. The UE 12 may perform rate-matching or other compensation, to encode the data in the reduced number of resources being used for data.

In any case, the UE 12 determining that a data transmission "is to carry," or "will carry," or "was to carry" UCI comprises in one or more embodiments the UE 12 determining that a time for sending UCI coincides with the time for performing the data transmission. For example, the time for sending the UCI falls into the same time slot, same subframe, or same other transmission time interval used for synchronized uplink transmission by the UE 12. In this sense, the radio links between the UE 12 and its serving radio network node(s) 22 may be structured timewise using a frame structure, where recurring frames each comprise a defined number of subframes, and where each subframe comprises one or more time slots, or otherwise encompasses a defined number of "symbol" times.

Responsive to determining that the data transmission will not carry UCI—NO from Block 404—the UE 12 follows (Block 406) "normal" processing, meaning that it complies with, adheres to, or otherwise "follows" the preemption indicator. "Following" the preemption indicator means that the UE 12 complies with the preemption indicator and skips the data transmission.

On the other hand, responsive to determining that the data transmission will carry UCI—YES from Block 404—the UE 12 in one embodiment ignores (Block 408A) the preemption indicator by performing the data transmission, where the data transmission includes the UCI. As a refinement of this approach, the ignoring may be conditioned on the type or priority of the UCI to be transmitted. Thus, for certain types or priorities of UCI, the UE 12 follows the preemption indicator and for certain other types or priorities of UCI, the UE 12 ignores the preemption indicator.

In another embodiment of the UE 12, or under other operating conditions, in response to determining that the data transmission will carry UCI, the UE 12 follows (Block 408B) the preemption indicator by skipping the data transmission. However, rather than simply not transmitting the UCI that would have been included in the skipped data transmission, the UE 12 separately transmits the UCI. As a refinement of this approach, the UE 12 separately transmits the UCI that would have been included in a skipped data transmission, only if the UCI is of a certain type or priority. The separate transmission of UCI may be performed at the time the data transmission would have been sent or it may be sent at a related later time. The separate UCI transmission may be performed as a PUCCH transmission, and it may be performed at least partially on the resources associated with the canceled PUSCH transmission or may be performed on other resources outside of the cancelled PUSCH allocation.

As noted, ignoring the preemption indicator may be triggered when the data transmission in question will include UCI of any type or priority. The act of ignoring a received preemption indicator may be conditioned on the UCI in question being of a certain type or priority. For example, HARQ feedback may be deemed critical and a received preemption indicator then ignored if the data transmission to be preempted will include HARQ feedback. Of course, other prioritizations or type-based criticalities may apply and may be dynamically defined, e.g., in dependence on the type(s) of communication services engaged in by the UE 12 and/or on other operating conditions. The network 10 also may provide configuration information that controls the basis by which the UE 12 decides when to ignore a preemption indicator.

Turning back to FIG. 2, the diagram also illustrates example implementation details for the radio network node 22 ("RNN" in the diagram). The example radio network node 22 includes communication circuitry 50 comprising receiver circuitry 52 and transmitter circuitry 54, along with processing circuitry 56, and storage 58. The storage 58 comprises one or more types of computer-readable media, such as one or more kinds of memory circuits or devices. Examples include any one or more of SRAM, DRAM, FLASH, EEPROM, Solid State Disk (SSD), and electromagnetic disk storage.

The processing circuitry 56 comprises one or more types of digital processing circuitry, such as one or more microprocessors, microcontrollers, Digital Signal Processors (DSPs), Field Programmable Gate Arrays (FPGAs), Application Specific Integrated Circuits (ASICs), or one or more Systems-on-a-Chip (SoC). Broadly, the processing circuitry 56 comprises fixed, non-programmable circuitry, or comprises programmed circuitry that is specially adapted to carry out the relevant preemption-related operations described herein for a radio network node 22 or comprises a mix of fixed and programmed circuitry.

In at least one such embodiment, the radio network node 22 includes one or more digital processing circuits, such as one or more microprocessors, that are configured as or operative as the illustrated processing circuitry 56, based on their execution of stored computer program instructions. To that end, the storage 58 in one or more embodiments stores one or more computer programs (CPs) 60, where "stores" here does not necessarily connote permanent or unchanging storage but does connote retention of at least some persistence, such as storage in working memory for program execution. The storage 58 in one or more embodiments also provides volatile and/or non-volatile storage for one or more items of configuration data (CFG. DATA) 62. Such data may be pre-provisioned in the radio network node 22 and/or obtained or generated dynamically during operation.

With the above in mind, a radio network node 22 configured for operation in a wireless communication network 10 comprises communication circuitry 50 configured for sending signals to and receiving signals from UEs 12. The communication circuitry 50 includes, for example, radio transceiver circuitry configured for radio-based communications in the network 10, such as a radiofrequency receiver 52 (or receivers) for receiving uplink signals from UEs 12, and a radiofrequency transmitter 54 (or transmitters) for transmitting downlink signals to UEs 12. The communication circuitry 50 further comprises interface circuitry, such as computer-data network interfaces or other interfaces configured to communicatively interconnect the radio network node 22 with the supporting or controlling nodes in the core network 26 (see FIG. 1) and with neighboring radio network nodes 22.

Further, the radio network node 22 comprises processing circuitry 56 that is operatively associated with the communication circuitry 50. Here, "operatively associated" means that the processing circuitry 56 sends and receives data and control signaling via the communication circuitry 50. For example, the processing circuitry 56 includes or is associated with baseband processing circuitry that implements a radio protocol stack used for receiving radio signals from a UE 12 via the communication circuitry 50 and recovering control signaling and data from the received signals, and for encoding and modulating outgoing control signaling and data, for transmission to UEs 12 via the communication circuitry 50.

The processing circuitry 56 in one or more embodiments is configured to determine whether an uplink data transmission by a UE 12 on certain radio resources will include UCI, and to transmit or not transmit a preemption indicator preempting use by the UE 12 of the certain radio resources for the uplink data transmission, in dependence on the determination. Such operations can be understood as an advantageous simplifying or streamlining of operations at the radio network node 22, wherein it skips the transmission of a preemption indicator that it knows will be ignored. In this sense, in at least one embodiment, the radio network node 22 "knows" that a given UE 12 will ignore a preemption indicator based on (1) knowing that the UE 12 is configured to ignore preemption indicators when sending a data transmission that includes UCI, and (2) knowing that a time at which the UE 12 will send UCI coincides with the data transmission in question. For example, the radio network node 22 knows the scheduled transmission time for the data transmission and the radio network node 22 knows whether that time corresponds to a defined time for the UE 12 to send UCI. For example, the data-transmission time coincides with the subframe at which the UE 12 is required to send HARQ feedback for a preceding downlink (DL) transmission to the UE 12 by the radio network node 22, or the data-transmission time coincides with a periodic transmission of UCI by the UE 12.

In embodiments where the UE 12 in question ignores a preemption indicator only if the corresponding data transmission will include UCI of a certain type or priority, the processing circuitry 56 of the radio network node 22 is configured to determine whether the uplink data transmission in question will include UCI of the certain type or priority, such that the radio network node 22 does not transmit the preemption indicator when the UCI is of the certain type or priority, and otherwise transmits the preemption indicator.

In the same embodiment(s) or in a further embodiment of the radio network node 22, the processing circuitry 56 is configured to receive an uplink data transmission from a UE 12 on radio resources that include preempted radio resources, and process the uplink data transmission, as received at the radio network node 22, to account for the UE 22 avoiding use of the preempted radio resources. Such processing comprises, for example, controlling demodulation to avoid including demodulation results for the preempted radio resources with demodulation results for non-preempted radio resources used by the UE.

In a more detailed example, the UE 12 in question applies the preemption indicator to the corresponding data transmission either by discarding certain data before multiplexing the remaining data and UCI together, to avoid use of the particular radio resources that are preempted, while using the surrounding or remaining radio resources that were allocated for the data transmission. Alternatively, the UE 12 performs the multiplexing and then discards the portions of the multiplexing result (e.g., the generated modulation information for mapping onto OFDM subcarriers) that correspond to the preempted radio resources. Correspondingly, the processing circuitry 56 at the radio network node 22 is configured to account for such exclusions (preemptions) when recovering the information conveyed in the data transmission.

FIG. 5 depicts an embodiment of the radio network node 22, wherein one or more processing units or functional modules are configured to perform any or all of the foregoing operations at the radio network node 22. In an example case, the processing units or functional modules, which are realized via underlying processing circuitry, include a receiving module (RX MODULE) 64, that is configured to receive data transmissions from a UE 12. The radio network node 22 further includes a determining module (DET. MODULE) 66 and a transmit module (TX MODULE) 68.

The determining module 66 in at least one embodiment is configured to determine whether a data transmission by a UE 12 will include UCI, and to transmit, via the TX module 68, a preemption indicator corresponding to the data transmission, in dependence on whether the data transmission will include UCI. In other words, in a case where the radio network node 22 is going to send a preemption indicator, e.g., to preempt the use of radio resources scheduled for an eMBB data transmission, so as to reduce interference caused to a URLLC transmission, the radio network node 22 determines whether the UE 12 in question is going to ignore the preemption indicator (based on being configured to ignore the preemption indicator if the data transmission in question will carry UCI from the UE 12). If the radio network node 22 determines that the UE 12 will ignore the preemption indicator, it skips the transmission of the preemption indicator.

In at least one embodiment of the radio network node 22, the processing units or modules further include a processing module (PROC. MODULE) 70 that is configured to control how a received uplink data transmission from a UE 12 is processed, in dependence on whether the radio network node 22 sent a preemption indicator to preempt the data transmission and the UE 12 ignored the preemption indicator. That is, in a case where the radio network node 22 sent a preemption indicator but the UE 12 ignores the preemption indicator and sends the data transmission, e.g., because the data transmission includes UCI, the radio network node 22 may process the received data transmission to account for actions taken at the UE 12 in response to receiving the preemption indicator.

For example, the UE 12 may alter the data transmission to avoid using particular radio resources involved in the preemption—the preempted radio resources—and the radio network node 22 may adjust its demodulation or other processing to account for that avoidance. In one such embodiment, the processing avoids demodulating signal from the preempted radio resources, or avoids using the demodulation results therefrom, in the context of recovering data and/or UCI from the other radio resources allocated for the data transmission.

Figure 6:
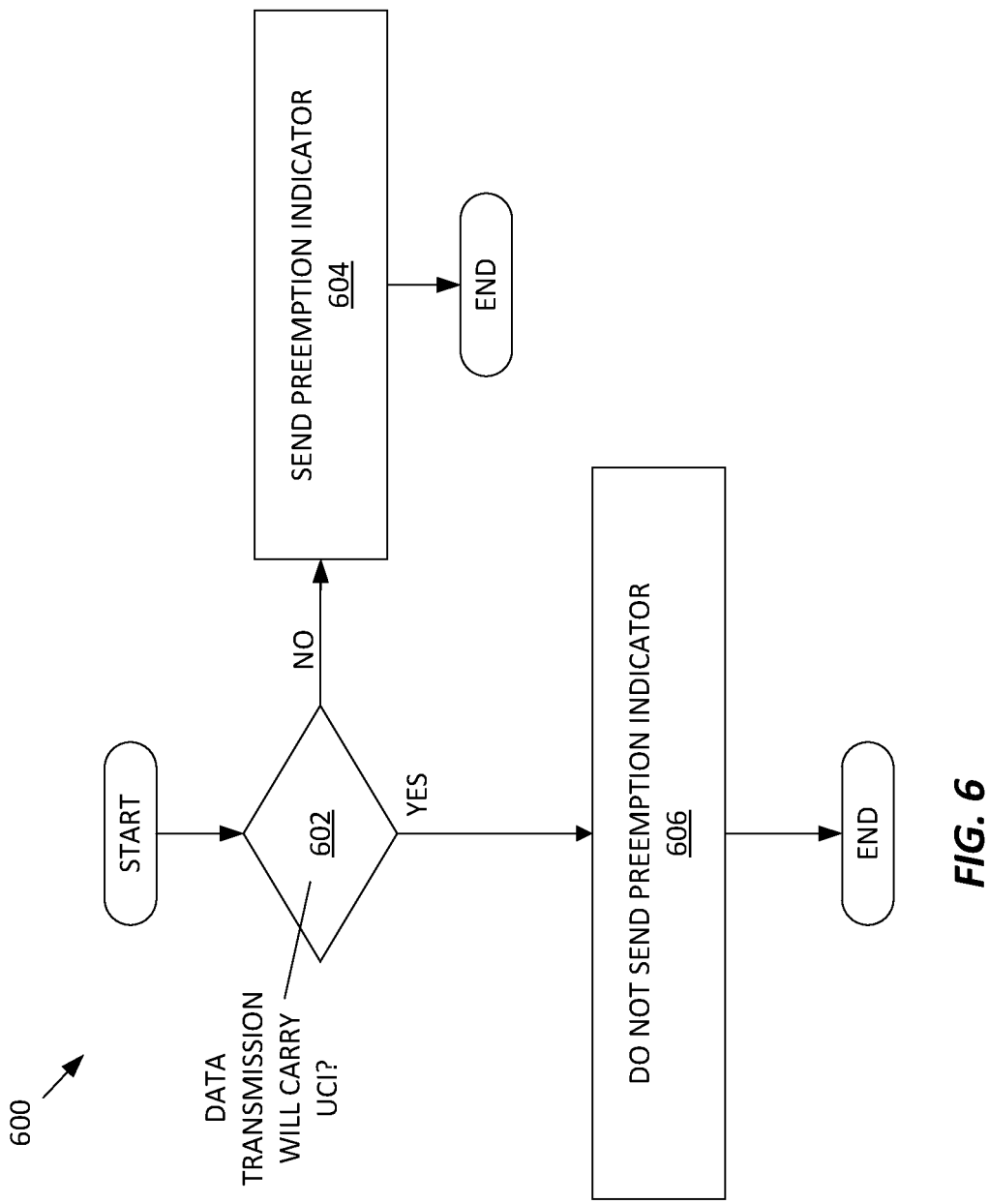
FIG. 6 is a logic flow diagram of one embodiment of a method of operation by a radio network node.

FIG. 6 illustrates one embodiment of a method 600 of processing performed by a radio network node 22, e.g., by the radio network node 22 shown in FIGS. 1 and 2. As a backdrop to the illustrated processing, a UE 12 has pending uplink data transmission that involves radio resources that are going to be used for a preempting transmission, e.g., the UE 12 will perform an eMBB transmission on radio resources that will be used for a coincident URLLC transmission by another UE 12. "Normal" behavior here involves the radio network node 22 sending a preemption indicator to the UE 12 scheduled to perform the eMBB transmission, to preempt that transmission. However, if the radio network node 22 knows that that UE 12 is configured to ignore preemption indicators when the affected data transmissions include UCI, the radio network node 22 may skip transmission of the preemption indicator.

Thus, the method 600 includes determining (Block 602) whether the data transmission in question will carry UCI. If not, the radio network node 22 sends the preemption indicator (Block 604). If so, the radio network node does not send the preemption indicator, i.e., it skips sending the preemption indicator (Block 606).

In one example, determining whether the uplink data transmission by the UE 12 on the certain radio resources will include UCI comprises determining whether the uplink data transmission will include UCI of a certain type or priority, such that the radio network node 22 does not transmit the preemption indicator when the UCI is of the certain type or priority, and otherwise transmits the preemption indicator. This reflects the fact that the UE 12 may be configured to ignore preemption indicators only when certain types or priorities of UCI are involved.

Also, as noted, a radio network node 22 in one or more embodiments may perform a method wherein it receives an uplink data transmission from a UE 12 on radio resources that include preempted radio resources, and process the uplink data transmission, as received at the radio network node 22, to account for the UE 12 avoiding use of the preempted radio resources in its uplink data transmission. Such processing comprises, for example, controlling demodulation to avoid including demodulation results for the preempted radio resources with demodulation results for non-preempted radio resources used by the UE.

Figure 7:
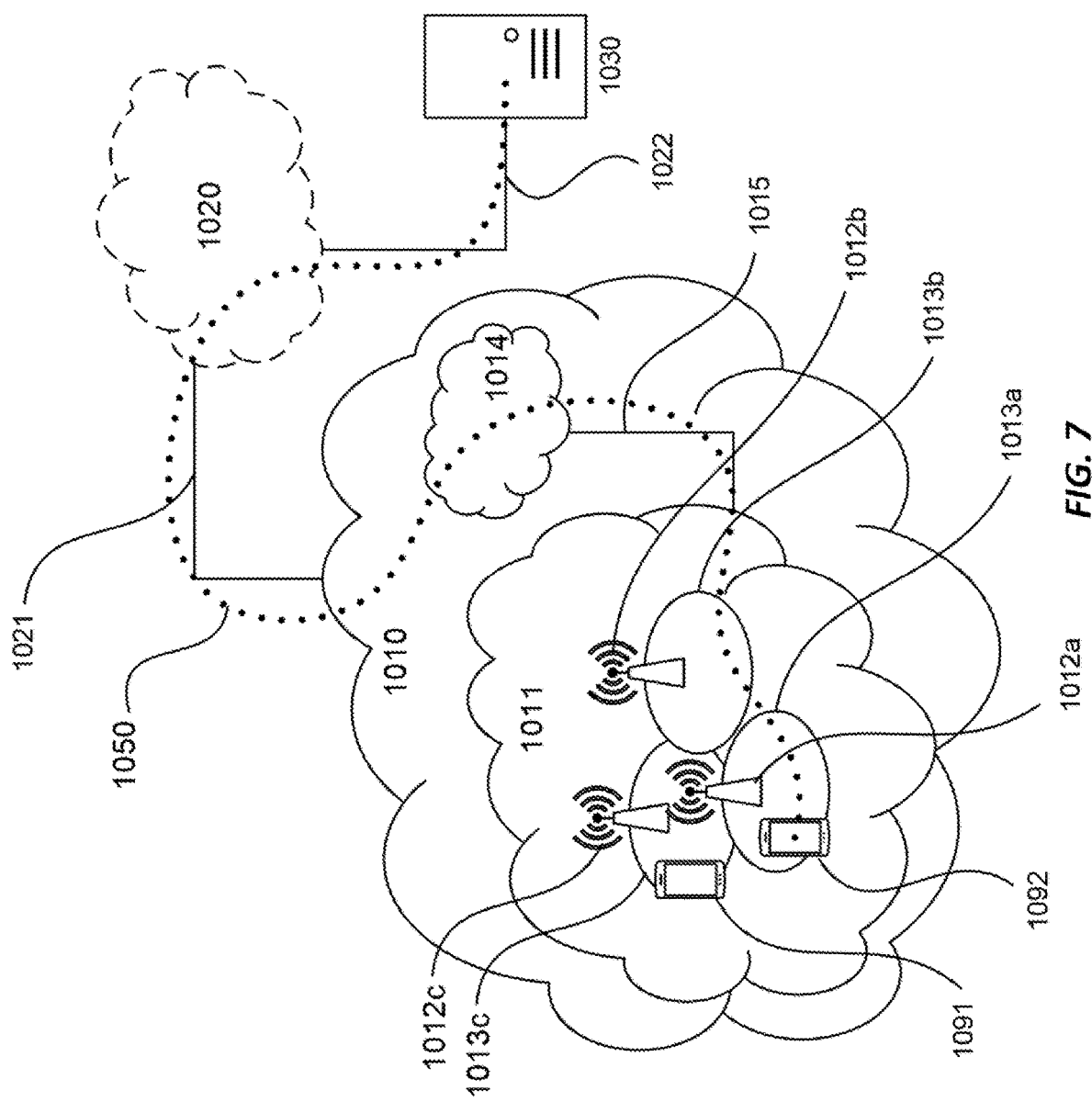
FIG. 7 is a block diagram of a communication network according to another embodiment.

As for further extensions and variations of the network-node and UE operations contemplated herein, FIG. 7 depicts an example communication system which includes telecommunication network 1010, such as a 3GPP-type cellular network, which comprises access network 1011, such as a radio access network, and a core network 1014. Access network 1011 comprises a plurality of base stations 1012a, 1012b, 1012c, e.g. operating as radio network nodes 22, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A first UE 1091, e.g., operating as a previously-described UE 12, located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012. All such UEs may operate as described for a UE 12 herein.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 7 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink (UL) and downlink (DL) communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Example implementations, in accordance with an embodiment, of the UE, base station and host computer discussed in the preceding paragraphs will now be described with reference to FIG. 8. In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area served by base station 1120. Communication interface 1126 may be configured to facilitate connection 1160 to host computer 1110. Connection 1160 may be direct, or it may pass through a core network of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to above, and its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

Figure 8:
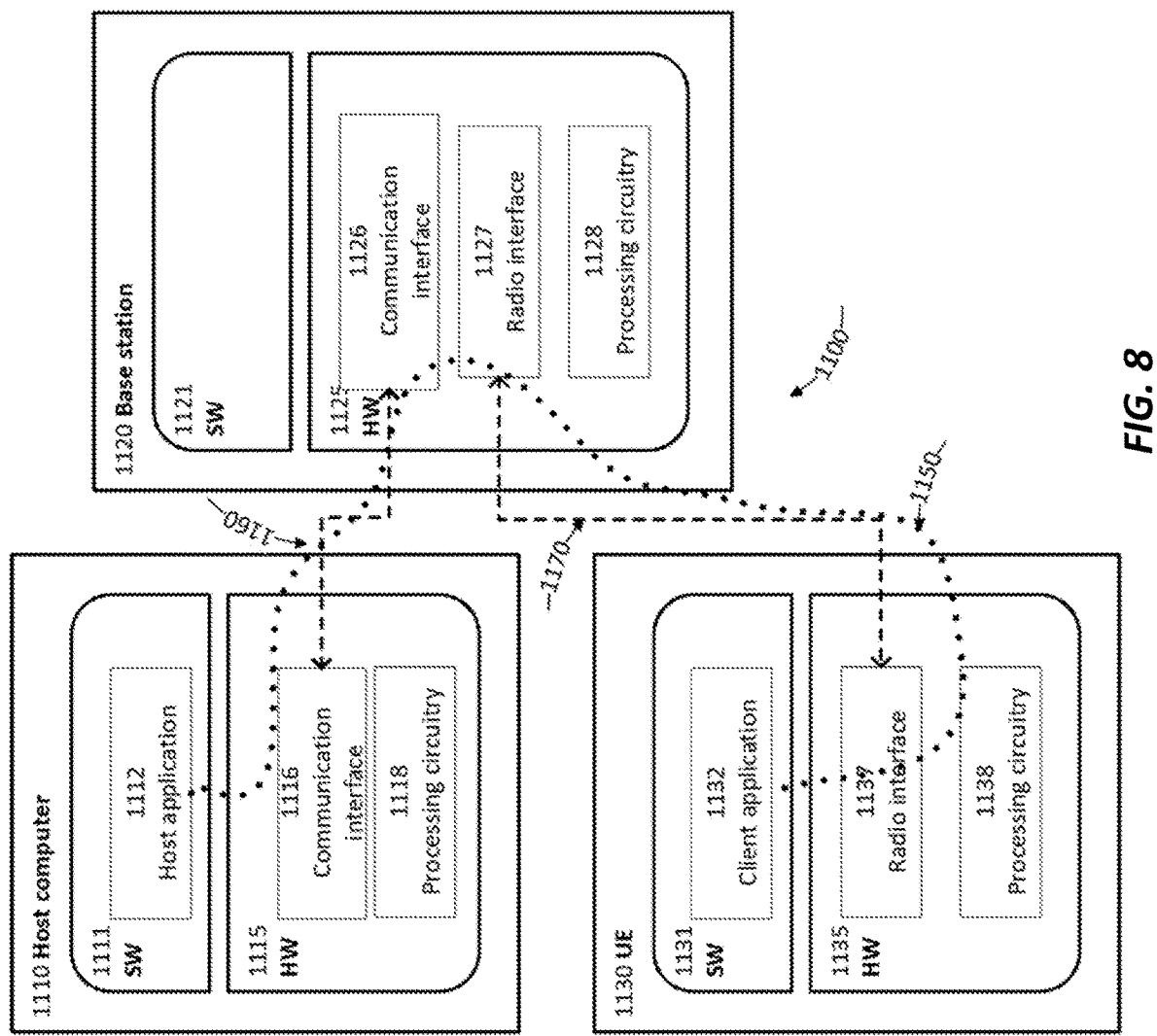
FIG. 8 is a block diagram of example implementation details for a UE, a base station, and a host computer, such as seen in FIG. 7.

It is noted that host computer 1110, base station 1120 and UE 1130 illustrated in FIG. 8 may be similar or identical to host computer 1030, one of base stations 1012a, 1012b, 1012c and one of UEs 1091, 1092 of FIG. 7, respectively. This is to say, the inner workings of these entities may be as shown in FIG. 8 and independently, the surrounding network topology may be that of FIG. 7.

In FIG. 8, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may reduce the RA latency and thereby provide benefits such as improved performance of the communications network, in particular when transmitting infrequent small data packets.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

FIG. 9 is a flowchart illustrating a method 1200 implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In step 1210, the host computer provides user data. In sub step 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

FIG. 10 is a flowchart illustrating a method 1300 implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In step 1310 of the method 1300, the host computer provides user data. In an optional sub step (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

Figures 11, 12:
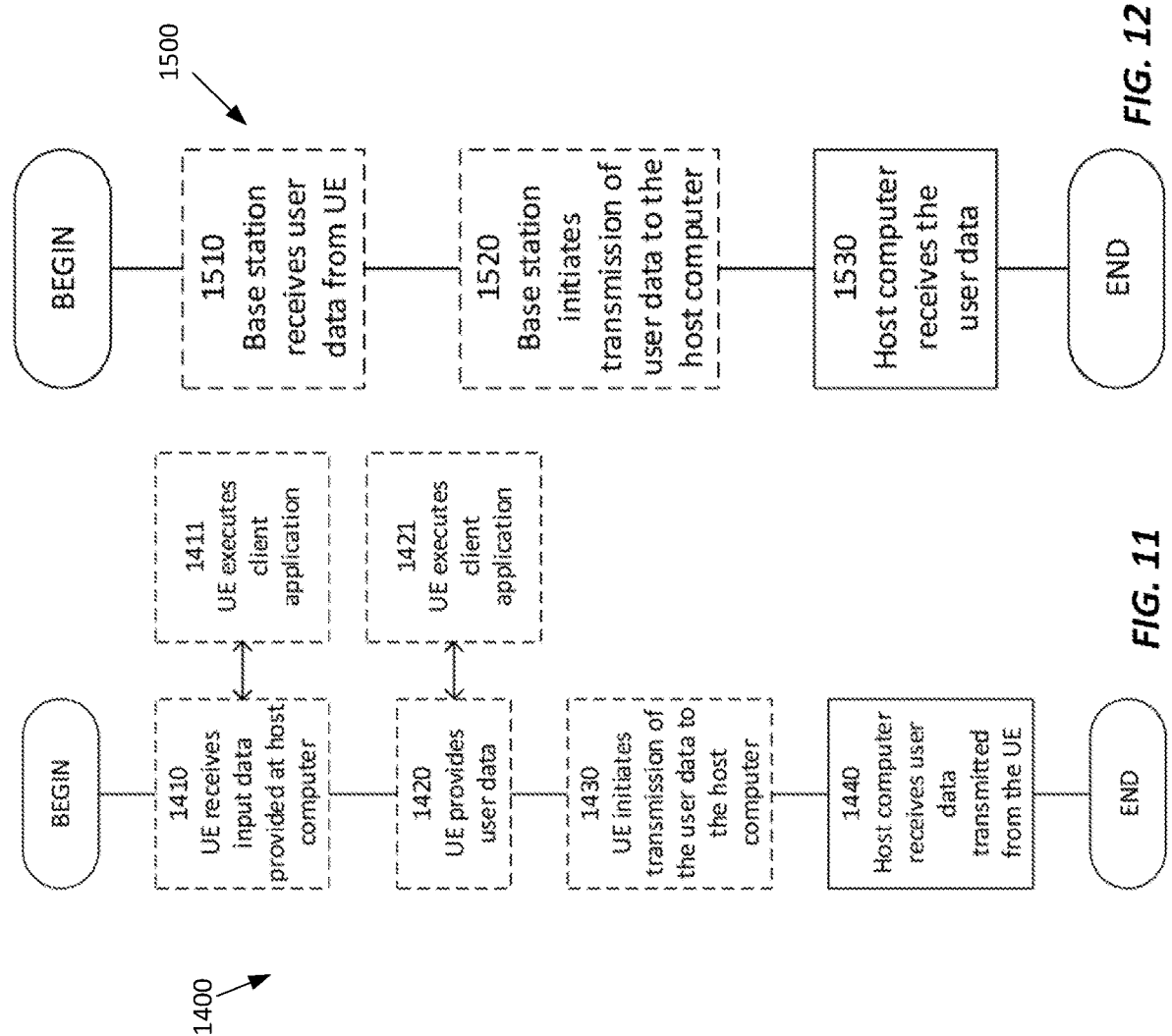

FIG. 11 is a flowchart illustrating a method 1400 implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In step 1410 (which may be optional), the UE receives input data provided by the host computer. Additionally, or alternatively, in step 1420, the UE provides user data. In sub step 1421 (which may be optional) of step 1420, the UE provides the user data by executing a client application. In sub step 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in sub step 1430 (which may be optional), transmission of the user data to the host computer. In step 1440 of the method 1400, the host computer receives the user data transmitted from the UE, in accordance with the teachings of the embodiments described throughout this disclosure.

FIG. 12 is a flowchart illustrating a method 1500 implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according to one or more embodiments of the present disclosure.

With all the above examples and embodiments in mind, this disclosure presents techniques, embodied via methods and/or apparatuses, for the cancellation or interruption, or modification, of uplink data transmissions that include UCI, such as included via puncturing or multiplexing with rate matching. In one example involving 3GPP-based channel definitions, the data transmission is a PUSCH transmission that carries UCI. In a particular example, the data transmission is an eMBB-related transmission that encompasses radio resources to be used for a URLLC-related transmission. In any case, the techniques proposed herein reduce the impact of preemption on the transmission of UCI, while still providing flexibility with respect to the need to preempt radio resource usage by UEs.

In an example case, a UE 12 is configured such that, upon reception of a preemption indicator, the UE 12 does not cancel the affected PUSCH transmission, if certain conditions apply. In an example configuration, the UE 12 does not cancel its PUSCH transmission if the PUSCH contains certain contents, such as UCI, or certain types or priorities of UCI, like ACK/NACK signaling. In another example, the UE 12 does not cancel its PUSCH transmission if the PUSCH transmission contains contents of a certain priority. For example, there may be different priorities of UCI and the UE 12 does not cancel the PUSCH transmission if it will carry UCI at or above a certain priority.

According to one method, a PUSCH is not cancelled if it contains UCI. In a radio network node 22 (or another type of node in the network 10), this could mean that the cancellation indication is not sent for certain resources if those resources contain PUSCH with the UCI. In a UE 12, this means that the UE 12 does not cancel a PUSCH transmission when the UE 12 receives a cancellation indicator—a preemption indicator—pointing to radio resources which overlap with a pending PUSCH transmission, when the PUSHC transmission includes UCI. Another implication of the underlying "rule" is that the UE 12 does not need to monitor for a cancellation indication when the UE 12 is scheduled to transmit UCI on PUSCH.

Also, as described earlier herein, rather than ignoring a cancellation indicator with respect to a PUSCH transmission that will carry UCI, the UE 12 may "follow" the cancellation indicator by skipping the PUSCH transmission. However, the UE 12 performs a separate transmission of the UE, e.g., it performs a PUCCH transmission in the same slot that would have been used for the PUSCH transmission. The separate transmission may or may not overlap with the radio resources implicated by the cancellation indication. In at least one embodiment, the UE 12 avoids use of the pre-empted radio resources when transmitting the PUCCH, at least when possible.

Further, rather than performing the separate transmission of the UCI in the same slot as the canceled data transmission, the UE 12 transmits the UCI—e.g., performs a PUCCH transmission—in a subsequent slot that is selected according to a defined offset. The offset can be statically defined as a rule or can be configured by higher layers or signaled to UE via user specific Downlink Control Information (DCI) or indicated in the cancellation indicator.

As for ignoring or following a cancellation indicator in dependence on the priority of the UCI to be included in the affected data transmission, the UCI may comprise ACK/NACK signaling that is considered low priority, e.g., based on the involved communication service, and the UE 12 correspondingly follows the cancellation indicator and skips the data transmission, nor does it perform a separate transmission of the UCI. Other ACK/NACK signaling may have a higher priority and in cases involving such signaling, the UE 12 will ignore the cancellation indicator and perform the data transmission, or will follow the cancellation indicator and skip the data transmission but perform a separate transmission of the UCI. Similar priority schemes may involve other kinds of UCI, such as Status Reports (e.g., uplink buffer status reports), Channel State Information (CSI) reporting, etc.

Also, as noted, the UE 12 may technically ignore a cancellation indicator by performing the data transmission that would otherwise be cancelled, however, the UE 12 may modify that data transmission because of the cancellation indicator. For example, the UE 12 may change its uplink signal multiplexing/prioritization procedure compared to the scenario without the cancellation indicator. In other words, the cancellation indicator is factored in the procedure of resolving overlapping UCI and PUSCH.

In one alternative, the cancellation indicator is applied before the start of the normal multiplexing/prioritization procedure, and some uplink signals are discarded before applying the normal multiplexing/prioritization procedure. For example, a portion or all of the PUSCH transmission is discarded when the PUSCH resource overlaps with the pre-empted time/frequency resources and the timeline requirement is satisfied. The remaining UCI in the slot is multiplexed and/or prioritized using the normal procedure assuming that the PUSCH does not exist.

That is, the "normal" procedure in one or more embodiments is as follows:

If UE has UCI to be transmitted in slot X and data to be transmitted in the same slot X, the UE should piggyback UCI on PUSCH; and If UE has UCI to be transmitted in slot X and has no data in slot X, the UCI transmission is performed by PUCCH.

Thus, the techniques at issue in this disclosure address, among other things, a case where the UE has UCI to send on the PUSCH and where the UE has received a cancellation indicator for the PUSCH. The normal procedure of multiplexing UCI with the PUSCH is problematic because the scheduled PUSCH has been canceled. Correspondingly, one approach is for the UE to break the normal procedure or rule that dictates multiplexing the UCI with the PUSCH. Instead, the UE cancels the scheduled PUSCH in compliance with the cancellation indicator, but the UE sends the UCI on PUCCH, as if there had been no PUSCH scheduled.

As for example multiplexing/prioritization procedures regarding a PUCCH transmission, when the UE has multiple items of UCI (e.g., scheduling request, HARQ-ACK bits, CSI), the UE should multiplex all pieces of information in one message to be carried by one PUCCH format. On the other hand, only certain PUCCH formats are available in given resources, so PUCCH can carry up to certain payload. Thus, UE should "prioritize" information in UCI, e.g. throw away CSI and send only HARQ-ACK bits.

In another example, due to receiving a cancellation indicator, a portion or all of the PUSCH and a set of low priority UCI(s) are discarded where their resources overlap with the pre-empted time/frequency resources and when the timeline requirement is satisfied. The remaining UCI (if any) in the slot are multiplexed and/or prioritized assuming that the PUSCH and the set of low priority UCI(s) does not exist. The set of low priority UCI(s) may include one or more of the following: periodic CSI, semi-persistent CSI, which is triggered by a DCI, HARQ-ACK response for low priority downlink data, and low priority SR.

In another alternative, the cancellation indicator is "applied" to the outcome of the normal multiplexing/prioritization procedure. For example, a portion or all of a PUSCH is discarded when the PUSCH resource(s) overlap with the pre-empted time/frequency resources and the timeline requirement is satisfied, Here the PUSCH is the outcome of normal multiplexing/prioritization procedure by the UE 12, and the PUSCH may carry data only, or carry a mixture of data and UCI, or carry UCI only.

In another example of applying the cancellation indicator to the multiplexing outcome, a portion or all of a PUCCH is discarded when the PUCCH resources overlap with the pre-empted time/frequency resources and the timeline requirement is satisfied. Here the PUCCH is the outcome of normal multiplexing/prioritization procedure, and the PUCCH may carry one or more of UCI types. The UCI includes HARQ-ACK, CSI (periodic or aperiodic), or SR.

In yet another example, a PUCCH may or may not be discarded due to the cancellation indicator, depending on the PUCCH format. If the PUCCH format is a type of short PUCCH, then the PUCCH is not discarded. If the PUCCH format is a type of long PUCCH, then a portion or all of the PUCCH is discarded.

In yet another example, a PUCCH may or may not be discarded due to the cancellation indicator, depending on if the PUCCH is single-slot or multi-slot. If the PUCCH is single-slot, then the PUCCH is not discarded. If the PUCCH is multi-slot, then a portion or all of the PUCCH is discarded.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

EXAMPLE EMBODIMENTS

Group A Embodiments

1. A method performed by a User Equipment (UE) configured for operation in a wireless communication network, the method comprising:
   receiving a preemption indicator, indicating preemption of a forthcoming data transmission by the UE; and
   responsive to determining that the data transmission will carry Uplink Control Information (UCI) from the UE:
      ignoring the preemption indicator by performing the data transmission, including the UCI, at least when the UCI is of a certain type or priority; or
      following the preemption indicator by skipping the data transmission, and separately transmitting the UCI, at least when the UCI is of a certain type or priority.
2. The method of embodiment 1, wherein ignoring the preemption indicator by performing the data transmission comprises performing the data transmission with the UCI included therein, regardless of the type or priority of the UCI.
3. The method of embodiment 1, wherein ignoring the preemption indicator by performing the data transmission comprises performing the data transmission with the UCI included therein, when the UCI is Hybrid Automatic Repeat reQuest (HARQ) feedback from the UE.
4. The method of embodiment 1, wherein ignoring the preemption indicator by performing the data transmission comprises performing the data transmission with the UCI included therein, when a priority of the UCI is at or above a certain priority level or priority categorization.
5. The method of embodiment 1, wherein separately transmitting the UCI, at least when the UC is of a certain type or priority, comprises transmitting the UCI at a time corresponding to the data transmission or at a related subsequent time.
6. The method of any of embodiments 1-5, wherein the data transmission was to use prescheduled radio resources and wherein the preemption indicator indicates preemptive use of the prescheduled radio resources.
7. The method of any of embodiments 1-6, wherein, according to applicable specifications and associated definitions promulgated by the Third Generation Partnership Project (3GPP), the data transmission is an enhanced Mobile Broadband (eMBB) transmission, and wherein the preemption indicator provides for preemptive use of radio resources allocated for the eMBB transmission by another UE engaged in Ultra-Reliable and Low Latency Communication (URLLC).
8. The method of any of embodiments 1-7, wherein the data transmission is a Physical Uplink Shared Channel (PUSCH) transmission, and wherein determining that the data transmission will carry the UCI from the UE comprises determining that a time for performing a Physical Uplink Control Channel (PUCCH) transmission coincides with a time of the PUSCH transmission.
9. The method of embodiment 8, wherein ignoring the preemption indicator by performing the data transmission, including the UCI, comprises multiplexing the UCI with data to be conveyed in the PUSCH transmission and performing the PUSCH transmission.
10. A method performed by a User Equipment (UE) configured for operation in a wireless communication network, the method comprising:
   receiving a preemption indicator from a radio network node of the wireless communication network; and when an uplink data transmission that would otherwise be preempted in accordance with the preemption indicator coincides with a transmission of Uplink Control Information (UCI) by the UE, ignoring the transmission preemption indicator by performing the uplink data transmission, data conveyed via the uplink data transmission having the UCI multiplexed therein.

11. The method of embodiment 10, further comprising conditioning the step of ignoring the preemption indicator in dependence on a type or priority of the UCI, such that the UE follows the preemption indicator if the UCI is of a certain type or priority, and ignores the preemption indicator if the UCI is of a certain other type or priority.

12. A method performed by a User Equipment (UE) configured for operation in a wireless communication network, the method comprising:
  receiving a preemption indicator from a radio network node of the wireless communication network;
  following the preemption indictor and skipping an uplink data transmission to which the preemption indicator applies; and
  when the uplink data transmission was to carry Uplink Control Information (UCI) from the UE, performing a separate transmission of the UCI.

13. The method of embodiment 12, further comprising conditioning the step of performing the separate transmission of the UCI in dependence on a type or priority of the UCI, such that the UE does not perform the separate transmission of the UCI if the UCI is of a certain type or priority, and performs the separate transmission of the UCI if the UCI is of a certain other type or priority.

14. A method performed by a User Equipment (UE) configured for operation in a wireless communication network, the method comprising:
  receiving a preemption indicator from a radio network node of the wireless communication network; and
  when the preemption indicator applies to an uplink data transmission by the UE that will carry Uplink Control Information (UCI) from the UE, either ignoring the preemption indicator, or following the preemption indicator and performing a separate transmission of the UCI.

15. A User Equipment (UE) configured for operation in a wireless communication network, the UE comprising:
  communication circuitry configured to send signals to radio network nodes of the wireless communication network and to receive signals from radio network nodes of the wireless communication network; and
  processing circuitry operatively associated with the communication circuitry and configured to perform operations implementing any of the methods set out in embodiments 1-14.

16. A User Equipment (UE) configured for operation in a wireless communication network, the UE comprising:
  communication circuitry configured for sending signals to and receiving signals from radio access nodes in the wireless communication network; and
  processing circuitry operatively associated with the communication circuitry and configured to:
    receive a preemption indicator, indicating preemption of a forthcoming data transmission by the UE; and
    perform, in response to determining that the data transmission will carry Uplink Control Information (UCI) from the UE, one of the following operations:
      ignore the preemption indicator by performing the data transmission, including the UCI, at least when the UCI is of a certain type or priority; or
      follow the preemption indicator and skip the data transmission, and separately transmit the UCI, at least when the UCI is of a certain type or priority.

17. The UE of embodiment 16, wherein the processing circuitry is configured to ignore the preemption indicator, regardless of the type or priority of the UCI.

18. The UE of embodiment 16, wherein the processing circuitry is configured to ignore the preemption indicator, when the UCI is Hybrid Automatic Repeat reQuest (HARQ) feedback from the UE.

19. The UE of embodiment 16, wherein the processing circuitry is configured to ignore the preemption indicator, when a priority of the UCI is at or above a certain priority level or priority categorization.

20. The UE of embodiment 16, wherein, regarding the separate transmission of the UCI, the processing circuitry is configured to separately transmit the UCI at a time corresponding to the data transmission or at a related subsequent time.

21. The UE of any of embodiments 16-20, wherein the data transmission was to use prescheduled radio resources and wherein the preemption indicator indicates preemptive use of the prescheduled radio resources.

22. The UE of any of embodiments 15-21, wherein, according to applicable specifications and associated definitions by the Third Generation Partnership Project (3GPP), the data transmission is an enhanced Mobile Broadband (eMBB) transmission, and wherein the preemption indicator provides for preemptive use of radio resources allocated for the eMBB transmission by another UE engaged in Ultra-Reliable and Low Latency Communication (URLLC).

23. The UE of any of embodiments 15-22, wherein the data transmission is a Physical Uplink Shared Channel (PUSCH) transmission, and wherein the processing circuitry is configured to determine that the data transmission will carry the UCI from the UE by determining that a time for performing a Physical Uplink Control Channel (PUCCH) transmission coincides with a time of the PUSCH transmission.

24. The UE of embodiment 23, wherein, in ignoring the preemption indicator by performing the data transmission, including the UCI, the processing circuitry is configured to multiplex the UCI with data to be conveyed in the PUSCH transmission and perform the PUSCH transmission.

25. A User Equipment (UE) configured for operation in a wireless communication network, the UE comprising:
  communication circuitry configured for sending signals to and receiving signals from radio access nodes in the wireless communication network; and
  processing circuitry operatively associated with the communication circuitry and configured to monitor for reception of a preemption indicator in relation to a pending uplink data transmission by the UE that will not include Uplink Control Information (UCI) from the UE, and to skip monitoring for reception of a preemption indicator in relation to a pending uplink data transmission by the UE that will include UCI from the UE.

26. A method performed by a User Equipment (UE) configured for operation in a wireless communication network, the method comprising:
  monitoring for reception of a preemption indicator in relation to a pending uplink data transmission by the UE that will not include Uplink Control Information (UCI) from the UE; and
  skipping monitoring for reception of a preemption indicator in relation to a pending uplink data transmission by the UE that will include UCI from the UE.

27. A User Equipment (UE) configured for operation in a wireless communication network, the UE comprising:
communication circuitry configured for sending signals to and receiving signals from radio access nodes in the wireless communication network; and
processing circuitry operatively associated with the communication circuitry and configured to:
monitor for reception of a preemption indicator in relation to a pending uplink data transmission by the UE that will not include Uplink Control Information (UCI) from the UE; and
skip monitoring for reception of a preemption indicator in relation to a pending uplink data transmission by the UE that will include UCI from the UE.

28. A User Equipment (UE) configured for operation in a wireless communication network, the UE comprising:
communication circuitry configured for sending signals to and receiving signals from radio access nodes in the wireless communication network; and
processing circuitry operatively associated with the communication circuitry and, with respect to performing an uplink data transmission for which the UE has received a preemption indicator and for which the UE is to include Uplink Control Information (UCI), configured to perform one of:
apply the preemption indicator before multiplexing uplink data and the UCI, by discarding at least a portion of the data to be included in the uplink data transmission, to thereby avoid use of preempted radio resources; or
apply the preemption indicator after multiplexing the data to be included in the uplink data transmission with the UCI, by discarding a portion of the multiplexing result, to thereby avoid use of the preempted radio resources.

29. A method performed by User Equipment (UE) configured for operation in a wireless communication network, the method comprising, with respect to performing an uplink data transmission for which the UE has received a preemption indicator and for which the UE is to include Uplink Control Information (UCI):
applying the preemption indicator before multiplexing uplink data and the UCI, by discarding at least a portion of the data to be included in the uplink data transmission, to thereby avoid use of preempted radio resources; or
applying the preemption indicator after multiplexing the data to be included in the uplink data transmission with the UCI, by discarding a portion of the multiplexing result, to thereby avoid use of the preempted radio resources.

Group B Embodiments

30. A method performed by a radio network node configured for operation in a wireless communication network, the method comprising:
determining whether an uplink data transmission by a User Equipment (UE) on certain radio resources will include Uplink Control Information (UCI); and
transmitting or not transmitting a preemption indicator preempting use by the UE of the certain radio resources for the uplink data transmission, in dependence on said determining.

31. The method of embodiment 30, wherein determining whether the uplink data transmission by the UE on the certain radio resources will include the UCI comprises determining whether the uplink data transmission will include UCI of a certain type or priority, such that the radio network node does not transmit the preemption indicator when the UCI is of the certain type or priority, and otherwise transmits the preemption indicator.

32. A radio network node configured for operation in a wireless communication network, the radio network node comprising:
communication circuitry configured to transmit signals to User Equipments (UEs) and receive signals from UEs; and
processing circuitry operatively associated with the communication circuitry and configured to:
determine whether an uplink data transmission by a UE on certain radio resources will include Uplink Control Information (UCI); and
transmit or not transmit a preemption indicator preempting use by the UE of the certain radio resources for the uplink data transmission, in dependence on said determining.

33. The radio network node of embodiment 32, wherein the processing circuitry is configured to determine whether the uplink data transmission by the UE on the certain radio resources will include the UCI by determining whether the uplink data transmission will include UCI of a certain type or priority, such that the radio network node does not transmit the preemption indicator when the UCI is of the certain type or priority, and otherwise transmits the preemption indicator.

34. A method performed by a radio network node configured for operation in a wireless communication network, the method comprising:
receiving an uplink data transmission from a User Equipment (UE) on radio resources that include preempted radio resources; and
processing the uplink data transmission, as received at the radio network node, to account for the UE avoiding use of the preempted radio resources.

35. The method of embodiment 34, wherein processing the uplink data transmission, as received at the radio network node, to account for the UE avoiding use of the preempted radio resources, comprises controlling demodulation to avoid including demodulation results for the preempted radio resources with demodulation results for non-preempted radio resources used by the UE.

36. A radio network node configured for operation in a wireless communication network, the radio network node comprising:
communication circuitry configured to transmit signals to User Equipments (UEs) and receive signals from UEs; and
processing circuitry operatively associated with the communication circuitry and configured to:
receive an uplink data transmission from a User Equipment (UE) on radio resources that include preempted radio resources; and
process the uplink data transmission, as received at the radio network node, to account for the UE avoiding use of the preempted radio resources.

37. The radio network node of embodiment 36, wherein, to process the uplink data transmission, as received at the radio network node, to account for the UE avoiding use of the preempted radio resources, the processing circuitry is configured to control demodulation to avoid including demodulation results for the preempted radio resources with demodulation results for non-preempted radio resources used by the UE.

Group C Embodiments

39. A communication system including a host computer comprising:
    processing circuitry configured to provide user data; and
    a communication interface configured to forward the user data to a cellular network for transmission to a user equipment (UE),
    wherein the cellular network comprises a base station or other type of radio network node having a radio interface and processing circuitry, the base station's processing circuitry configured to perform any of the steps of any of the Group B embodiments.
40. The communication system of the previous embodiment, further including the radio network node station.
41. The communication system of the previous 2 embodiments, further including the UE, wherein the UE is configured to communicate with the radio network node.
42. The communication system of the previous 3 embodiments, wherein:
    the processing circuitry of the host computer is configured to execute a host application, thereby providing the user data; and
    the UE comprises processing circuitry configured to execute a client application associated with the host application.
43. A method implemented in a communication system including a host computer, a base station or other type of radio network node, and a user equipment (UE), the method comprising:
    at the host computer, providing user data; and
    at the host computer, initiating a transmission carrying the user data to the UE via a cellular network comprising the radio network node, wherein the radio network node performs any of the steps of any of the Group B embodiments.
44. The method of the previous embodiment, further comprising, at the radio network node, transmitting the user data.
45. The method of the previous 2 embodiments, wherein the user data is provided at the host computer by executing a host application, the method further comprising, at the UE, executing a client application associated with the host application.
46. A user equipment (UE) configured to communicate with a base station or other radio network node, the UE comprising a radio interface and processing circuitry configured to perform any of the previous 3 embodiments.
47. A communication system including a host computer comprising:
    processing circuitry configured to provide user data; and
    a communication interface configured to forward user data to a cellular network for transmission to a user equipment (UE),
    wherein the UE comprises a radio interface and processing circuitry, the UE's components configured to perform any of the steps of any of the Group A embodiments.
48. The communication system of the previous embodiment, wherein the cellular network further includes a base station or other radio network node configured to communicate with the UE.
49. The communication system of the previous 2 embodiments, wherein:
    the processing circuitry of the host computer is configured to execute a host application, thereby providing the user data; and
    the UE's processing circuitry is configured to execute a client application associated with the host application.
50. A method implemented in a communication system including a host computer, a base station or other type of radio network node and a user equipment (UE), the method comprising:
    at the host computer, providing user data; and
    at the host computer, initiating a transmission carrying the user data to the UE via a cellular network comprising the radio network node, wherein the UE performs any of the steps of any of the Group A embodiments.
51. The method of the previous embodiment, further comprising at the UE, receiving the user data from the radio network node.
52. A communication system including a host computer comprising:
    communication interface configured to receive user data originating from a transmission from a user equipment (UE) to a base station or other type of radio network node,
    wherein the UE comprises a radio interface and processing circuitry, the UE's processing circuitry configured to perform any of the steps of any of the Group A embodiments.
53. The communication system of the previous embodiment, further including the UE.
54. The communication system of the previous 2 embodiments, further including the radio network node, wherein the radio network node comprises a radio interface configured to communicate with the UE and a communication interface configured to forward to the host computer the user data carried by a transmission from the UE to the radio network node.
55. The communication system of the previous 3 embodiments, wherein:
    the processing circuitry of the host computer is configured to execute a host application; and
    the UE's processing circuitry is configured to execute a client application associated with the host application, thereby providing the user data.
56. The communication system of the previous 4 embodiments, wherein:
    the processing circuitry of the host computer is configured to execute a host application, thereby providing requested data; and
    the UE's processing circuitry is configured to execute a client application associated with the host application, thereby providing the user data in response to the requested data.
57. A method implemented in a communication system including a host computer, a base station or other type of radio network node, and a user equipment (UE), the method comprising:
    at the host computer, receiving user data transmitted to the radio network node from the UE, wherein the UE performs any of the steps of any of the Group A embodiments.
58. The method of the previous embodiment, further comprising, at the UE, providing the user data to the radio network node.
59. The method of the previous 2 embodiments, further comprising:
    at the UE, executing a client application, thereby providing the user data to be transmitted; and
    at the host computer, executing a host application associated with the client application.

60. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

61. A communication system including a host computer comprising a communication interface configured to receive user data originating from a transmission from a user equipment (UE) to a base station or other type of radio network node, wherein the radio network node comprises a radio interface and processing circuitry, the radio network node's processing circuitry configured to perform any of the steps of any of the Group B embodiments.

62. The communication system of the previous embodiment further including the radio network node.

63. The communication system of the previous 2 embodiments, further including the UE, wherein the UE is configured to communicate with the radio network node.

64. The communication system of the previous 3 embodiments, wherein:
the processing circuitry of the host computer is configured to execute a host application;
the UE is configured to execute a client application associated with the host application, thereby providing the user data to be received by the host computer.

65. A method implemented in a communication system including a host computer, a base station or other type of radio network node, and a user equipment (UE), the method comprising:
at the host computer, receiving, from the radio network node, user data originating from a transmission which the radio network node has received from the UE, wherein the UE performs any of the steps of any of the Group A embodiments.

66. The method of the previous embodiment, further comprising at the radio network node, receiving the user data from the UE.

67. The method of the previous 2 embodiments, further comprising at the radio network node, initiating a transmission of the received user data to the host computer.

What is claimed is:

1. A method performed by a radio network node configured for operation in a wireless communication network, the method comprising:
determining whether an uplink data transmission by a User Equipment (UE) on certain radio resources will include Uplink Control Information (UCI); and
transmitting or not transmitting a preemption indicator preempting use by the UE of the certain radio resources for the uplink data transmission, in dependence on said determining;
wherein, in a case where the radio network node transmits the preemption indicator, the method further comprises the radio network node:
receiving an uplink data transmission from the UE on radio resources that include the certain radio resources; and
processing the uplink data transmission, as received at the radio network node, to account for the UE avoiding use of the preempted radio resources;
wherein processing the uplink data transmission, as received at the radio network node, to account for the UE avoiding use of the preempted radio resources, comprises controlling demodulation to avoid including demodulation results for the certain radio resources with demodulation results for remaining radio resources used by the UE for the uplink data transmission.

2. The method of claim 1, wherein determining whether the uplink data transmission by the UE on the certain radio resources will include the UCI comprises determining whether the uplink data transmission will include UCI of a certain type or priority, such that the radio network node does not transmit the preemption indicator when the UCI is of the certain type or priority, and otherwise transmits the preemption indicator.

3. A radio network node configured for operation in a wireless communication network, the radio network node comprising:
communication circuitry configured to transmit signals to User Equipments (UEs) and receive signals from UEs; and
processing circuitry operatively associated with the communication circuitry and configured to:
determine whether an uplink data transmission by a UE on certain radio resources will include Uplink Control Information (UCI); and
transmit or not transmit a preemption indicator preempting use by the UE of the certain radio resources for the uplink data transmission, in dependence on said determining;
wherein, in a case where the radio network node transmits the preemption indicator, the processing circuitry is configured to control the radio network node to:
receive an uplink data transmission from the UE on radio resources that include the certain radio resources; and
process the uplink data transmission, as received at the radio network node, to account for the UE avoiding use of the preempted radio resources, wherein processing the uplink data transmission, as received at the radio network node, to account for the UE avoiding use of the preempted radio resources, comprises controlling demodulation to avoid including demodulation results for the certain radio resources with demodulation results for remaining radio resources used by the UE for the uplink data transmission.

4. The radio network node of claim 3, wherein the processing circuitry is configured to determine whether the uplink data transmission by the UE on the certain radio resources will include the UCI by determining whether the uplink data transmission will include UCI of a certain type or priority, such that the radio network node does not transmit the preemption indicator when the UCI is of the certain type or priority, and otherwise transmits the preemption indicator.

* * * * *